United States Patent [19]
Groover

[11] Patent Number: 5,574,428
[45] Date of Patent: Nov. 12, 1996

[54] MESSAGE DISPLAY UNIT FOR MOTOR VEHICLES

[76] Inventor: John C. Groover, 3306 Miser Station Rd., Louisville, Tenn. 37777

[21] Appl. No.: 533,815

[22] Filed: Sep. 19, 1995

[51] Int. Cl.$^6$ ................................................ B60Q 1/26
[52] U.S. Cl. ........................ 340/468; 340/428; 340/464; 340/469; 340/471; 340/309.4; 340/525; 40/446; 327/385
[58] Field of Search ........................... 340/428, 463, 340/464, 465, 468, 469, 470, 471, 472, 309.4, 525; 40/446; 327/385

[56] References Cited

U.S. PATENT DOCUMENTS

| | | | |
|---|---|---|---|
| 2,605,338 | 7/1952 | Miller et al. | 340/468 |
| 2,851,674 | 9/1958 | Boone | 340/468 |
| 3,678,457 | 7/1972 | Lev | 340/468 |
| 3,750,138 | 7/1973 | Burgan et al. | 340/468 |
| 4,574,269 | 3/1986 | Miller | 340/468 |
| 4,868,542 | 9/1989 | Thompson | 340/468 |
| 4,928,084 | 5/1990 | Reiser | 340/479 |
| 4,949,071 | 8/1990 | Hutchison | 340/468 |
| 5,053,746 | 10/1991 | Taneo | 340/473 |
| 5,119,278 | 6/1992 | Watson | 362/80 |
| 5,132,666 | 7/1992 | Fahs | 340/468 |
| 5,426,414 | 6/1995 | Flatin et al. | 340/472 |

*Primary Examiner*—Jeffery Hofsass
*Assistant Examiner*—Daryl C. Pope
*Attorney, Agent, or Firm*—Luedeka Neely & Graham, P.C.

[57] ABSTRACT

A display unit for presenting messages from a motor vehicle in which messages are selected for presentation based upon the number of interruptions in the power supplied to the display unit. A power supply provides power to an interrupter, which produces, within a first predetermined time frame, interruptions in the power. The power interruptions are sensed and counted, and a timer measures the first predetermined time frame in which the interruptions in the power occur. A message storage means is provided, in which is stored at least one message to be presented. A controller selects one of the stored messages for presentation, based on the number of interruptions sensed in the power and the first predetermined time frame during which the interruptions occurred, and the message is presented on a display panel. In a preferred embodiment the controller ceases the presentation of the message after a second predetermined time frame, which is most preferably about three seconds.

21 Claims, 5 Drawing Sheets

MESSAGE DISPLAY UNIT FOR MOTOR VEHICLES

FIELD OF THE INVENTION

This invention relates to the field of electronic visual message displays, and more particularly to the field of electronic visual message communication displays for motor vehicles.

BACKGROUND OF THE INVENTION

One cause of accidents between motor vehicles is the inability of motorists to communicate with each other in a fast, safe, efficient manner. The importance of communication between motorists is underscored by the requirement that a vehicle have appropriate communication signals before it can be licensed for use on public roads. These signals include standardized methods of communicating actions such as turning, stopping, and reversing. Additional communication means are especially desirable for larger vehicles, such as trucks, which require more space to stop and turn than other motorists may anticipate, and which obstruct the view of the motorists behind the truck.

One method of communicating messages, in addition to the standard signals typically found on trucks, is a display unit on which the motorist, or a passenger, can present a message. Some of these devices can present an unlimited number of messages, and others present only a predetermined selection of messages. Those devices which can present an unlimited number of messages require an input device, such as a keyboard, on which the message is entered. Entry of a subsequent command presents the message on the display unit. Those devices which present a predetermined selection of messages typically provide an input device such as a switch with several positions, or a keypad with several keys, where each switch position or key corresponds to one of the predetermined messages. The selected message is presented by setting the switch to the desired position, or pressing the desired key.

Selecting the message to be presented on such devices diverts the motorist's attention from the road, and therefore the use of these devices may create a safety risk. For example, to use an input device such as a keypad, the motorist typically looks away from the road to find the appropriate key on the pad. Even in the case of the switch with several positions, which might be easily found by touch without looking away from the road, selection of the appropriate switch setting requires the motorist to divert attention from driving. Using a keyboard to type and enter a message for presentation typically requires an even greater amount of the motorist's attention.

What is needed, therefore, is a display unit for presenting messages from a motor vehicle, the use of which does not require the motorist to look away from the road, or require a significant amount of the motorist's attention in the selection of the message to be presented.

SUMMARY OF THE INVENTION

These and other needs are provided by a message display unit for a motor vehicle according to the present invention, in which messages are selected for presentation based upon the number of interruptions in the power supplied to the display unit. The power is provided by a power supply to an interrupter, which produces, within a first predetermined time frame, interruptions in the power. The power interruptions are sensed by a power sensor and counted by a counter, and a timer measures the first predetermined time frame in which the interruptions in the power occur. A message storage means is provided, in which is stored at least one message to be presented. A controller selects one of the stored messages for presentation, based on the number of interruptions sensed in the power supplied to the display unit and the first predetermined time frame during which the interruptions occurred. The message is presented on a display panel.

In a further embodiment a power limiter is provided for limiting the amount of power drawn from the power supply. A power storage device is also provided, which receives power from the power supply, and provides power when the power from the power supply is interrupted. A charger regulates the power received by the power storage device from the power supply. In a preferred embodiment the controller ceases the presentation of the message after a second predetermined time frame, which is most preferably about three seconds.

One of the benefits of the message display unit of the present invention is that one of many available messages can be selected for presentation with the use of a single switch which has only an open and a closed position. Not only can the motorist remain attentive to the road while finding the switch, which may be placed conveniently at hand, but the switch requires no more attention to use than does a horn, as the messages are selected by tapping the switch a certain number of times within a measured time frame.

BRIEF DESCRIPTION OF THE DRAWINGS

The present invention may best be understood by reference to a detailed description of preferred embodiments when considered in conjunction with the following drawings, in which like reference numbers refer to like elements throughout the several figures, and in which.

DETAILED DESCRIPTION OF THE PREFERRED EMBODIMENTS

Figure 1:
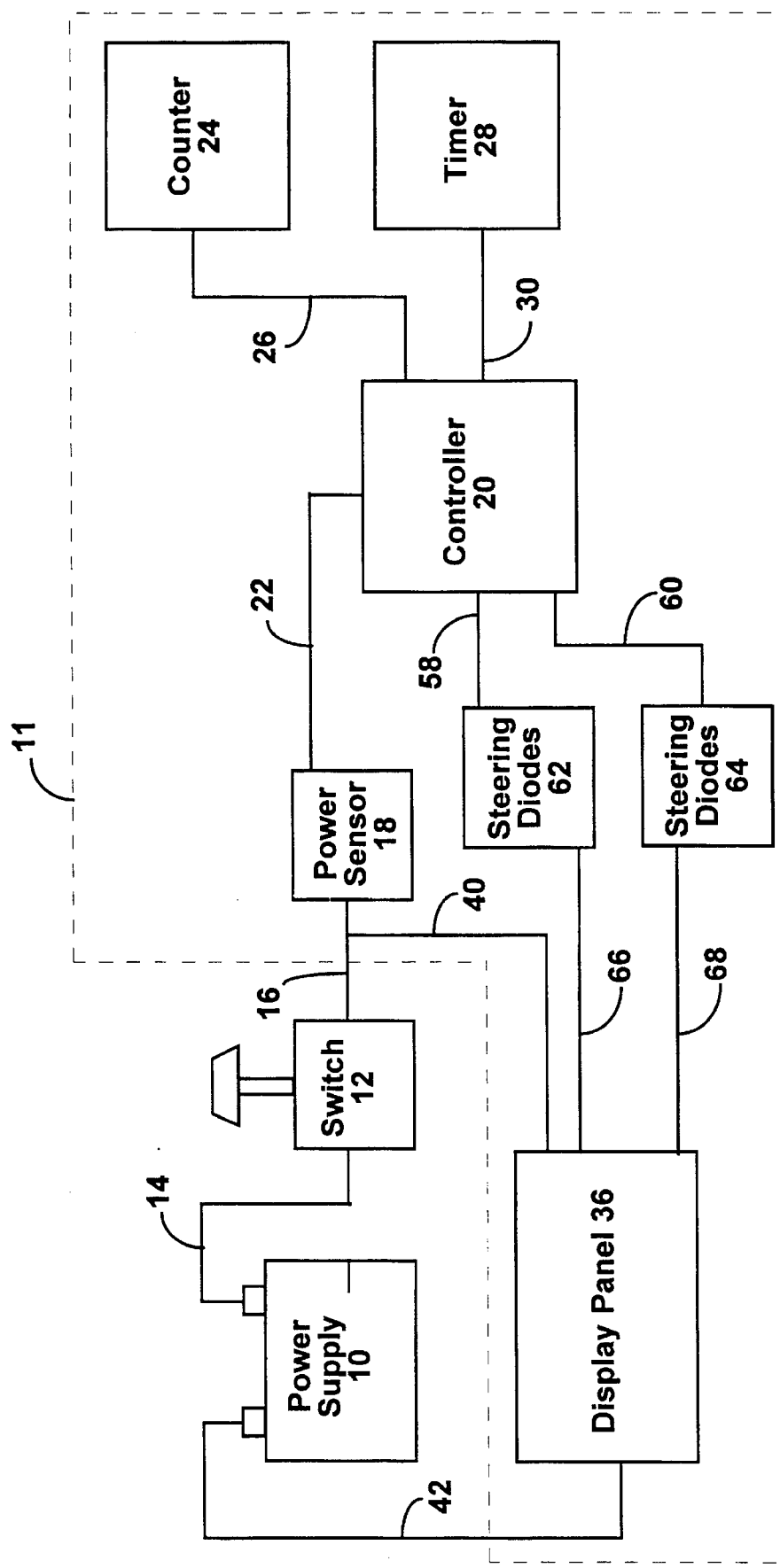
FIG. 1 is a functional schematic of a first embodiment of a display unit according to the present invention.

Referring now to the drawings, there is shown in FIG. 1 a functional schematic of a preferred embodiment of a message display unit 11 according to the present invention. The display unit 11 is powered by a power supply 10, such as a battery or a generator, which is preferably the power supply for the motor vehicle, such as a truck, in which the display unit 11 is located. In an alternate embodiment a dedicated power supply 10 is provided for the display unit 11.

Power from the power supply 10 is supplied to an interrupter switch 12 on line 14. The interrupter switch 12 is of the type that is normally closed, such that the power provided to the switch on line 14 normally passes without interruption through the switch 12 and out on line 16. The power passing through the switch 12 is interrupted by manually depressing the switch 12, which opens the circuit between line 14 and line 16. The switch 12 is preferably spring loaded so that when pressure is removed from the switch 12, the switch 12 returns to its normally closed position, allowing power to pass through to line 16 once again.

In the preferred embodiment the switch 12 is the same switch as that already found on many commercial trucking vehicles, which is connected between the power supply 10, or battery of the truck, and the running lights of the truck. Truck drivers use such switches 12 to momentarily flash the running lights of the truck as a signal to other motorists on the road.

Also in the preferred embodiment, the power supplied to the display unit 11 is acquired by attaching a clip (not depicted) to the wire which supplies power to the running lights of the truck. The clip does not sever the wire to which it attaches, so the running lights still receive power, but the clip penetrates the wire insulation and makes contact with the wire conductor, creating a power tap. Line 16 can be attached to the power tap created, and provide power to all of the components of display unit 11 in parallel with the running lights of the truck.

The power passing through the switch 12 and out on line 16 is detected by a power sensor 18, such as that available from Motorola as part number LM78L05ACZ, which senses the interruptions in the power on line 16. Upon occurrence of each interruption in the power, the power sensor 18 sends a signal to a controller 20, such as a microprocessor, on line 22. Associated with the controller 20 is a counter 24 which communicates with the controller 20 via line 26, and which is used by the controller 20 to count each occurrence of a power interruption as sensed by the power sensor 18. Also associated with the controller 20 is a timer 28, which communicates with the controller 20 via line 30, and which is used by the controller 20 to measure the length of the period of time in which the power interruptions sensed by the power sensor 18 occur. The functions of the controller 20, counter 24, and timer 28 may all be provided by a device such as that supplied by Microchip as part number PIC16C55-HS/P A plurality of messages are stored in a message storage means, represented in the embodiment depicted in FIG. 1 by sets of switches, such as steering diodes 62 and 64, each of which stores a single message, as described in more detail below. LiteOn supplies appropriate devices for use as the steering diodes 62 under part number 1N4007. The message storage means stores predetermined messages, the number of which is sufficiently few as to be easily remembered by the motorist without need to frequently reference a written list of the messages.

The controller 20 selects one of the stored messages for presentation by energizing one of either of the lines 58 or 60. It will be appreciated that, although only two sets of steering diodes 62 and 64 are depicted in FIG. 1, in alternate embodiments any number of such steering diode sets 62 and 64 could be provided, each of which stores a separate message. The selection of the stored message is based on the number of power interruptions produced by switch 12, and the length of the period of time in which the power interruptions occur, as explained below.

For example, in the preferred embodiment the controller 20 is programmed to look for a predetermined number of power interruptions within a first predetermined time frame, such as two seconds. For instance, if the power sensor 18 detects one interruption within the two second time frame, the controller 20 may be programmed to energize line 58, thus selecting the message stored by steering diodes 62. To continue the example, if the power sensor 18 detects two interruptions within the two second time frame, the controller 20 may be programmed to energize line 60, thus selecting the message stored by steering diodes 64.

Such a system is easy for a motorist to operate without diverting attention from the road. The switch 12 is preferably placed so as to fall easily at hand, without the motorist having to look away from the road to find it. Similarly, the motorist need not look away from the road to operate the switch 12, but selects the message by tapping the switch 12 a certain number of times within the two second time frame. Thus, minimal attention is required for the motorist to select a message for presentation.

While in the above example a two second time frame has been used, it will be appreciated that in different embodiments other time frames may be chosen, which may be either greater or less than two seconds.

After the controller 20 has selected a message by energizing either line 58 or line 60, the message is passed from the steering diodes 62 or 64 associated with the energized line 58 or 60, to a display panel 36 on the line 66 or 68 that is associated with the selected message, and the selected message is presented on the display panel 36 in a manner more fully explained hereafter.

Figure 2:
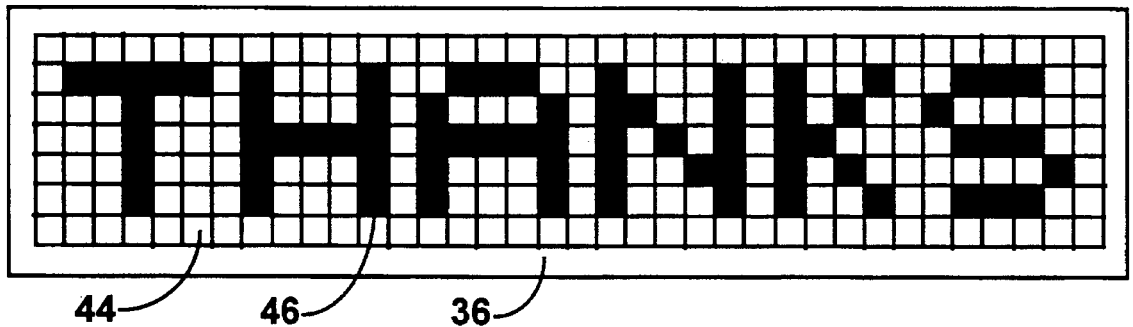
FIG. 2 is a depiction of a first embodiment of the display panel of the display unit.

As depicted in FIG. 2, the display panel 36 is preferably comprised of a matrix of display elements 44. By adjusting a characteristic of the selected display elements 46, a message is presented. The display elements 44 are provided by devices such as light emitting diodes, such as those supplied by LiteOn as part number LTP4557AE, or individual incandescent lights. Alternately, the display elements 44 are provided by a device which changes another characteristic upon selection, such as presenting a fluorescent colored dot when selected, and presenting a dark, contrasting appearance when not selected. Different display elements 44 are connected to each of the steering diodes within the sets 62 and 64.

A message is displayed in the manner illustrated in the following examples. If a first message is to be presented, the controller 20 energizes line 58, which is connected to steering diodes 62. There is one steering diode 62 for each display element 46 which needs to be illuminated to present the first message, and when each of the steering diodes 62 are energized, they provide power from line 40 to the associated display elements 46 via control line 66, thus causing the first message to be presented.

When a second message is to be presented, the controller 20 energizes line 60, which is connected to steering diodes 64. There is one steering diode 64 for each display element 46 which needs to be illuminated to present the second message, and when each of the steering diodes 64 are energized, they provide power from line 40 to the associated display elements 46 via control line 68, thus causing the message to be presented. Thus an additional set of steering diodes, such as 62 and 64, is required for each additional message which is desired for presentation.

Figure 3:
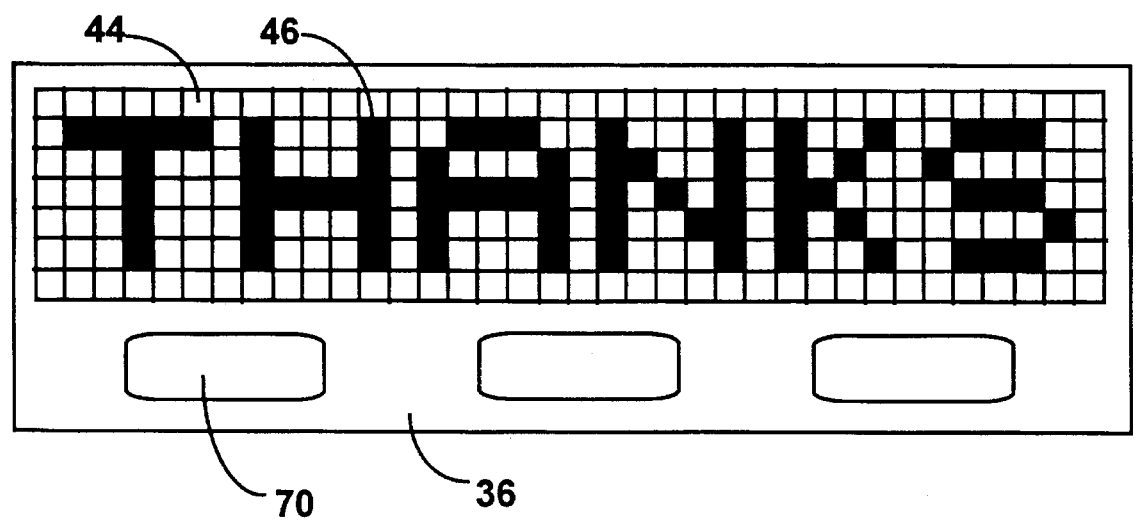
FIG. 3 is a depiction of a second embodiment of the display panel of the display unit.

In an alternate embodiment of the display panel 36, depicted in FIG. 3, a set of three marker lights 70 are included as a part of the display panel 36. The marker lights 70, unlike the rest of the display panel 36, are illuminated at all times that power is provided on line 16, as are the other running lights on the truck.

In a most preferred embodiment, the message will be presented on the display panel 36 for a second predetermined time frame, such as three seconds. In this manner, the display panel 36 will not continue to present the last message selected after the need for the message has passed, and the motorist does not need to curtail the presentation of the message.

Different messages, in the preferred embodiment, are presented on the display panel 36 for different lengths of time, and with a different method of presentation. For example, the message "wide turn," which may be presented before a turn, when the truck is moving slowly, could be presented for twenty seconds instead of three seconds, to ensure that motorists behind the truck have sufficient time to see and read the message.

In an alternate embodiment, certain messages flash on and off as they are presented, thus further increasing the likelihood of drawing attention to the presented message. This could be accomplished by the controller 20 intermittently energizing the selected output line 58 or 60. In yet another embodiment, a certain message, such as "emergency," is continually presented until subsequent interruptions in the power are sensed. These different times and methods of presentation can be applied in different combinations to either of the messages stored by steering diodes 62 or 64.

The power circuit is completed by line 42, which returns power from the display panel 36 to the power supply 10. In the preferred embodiment, and as is customary on trucks, the return line 42 is provided by the grounded frame of the truck, and so a dedicated line 42 is not typically required.

Figure 4:
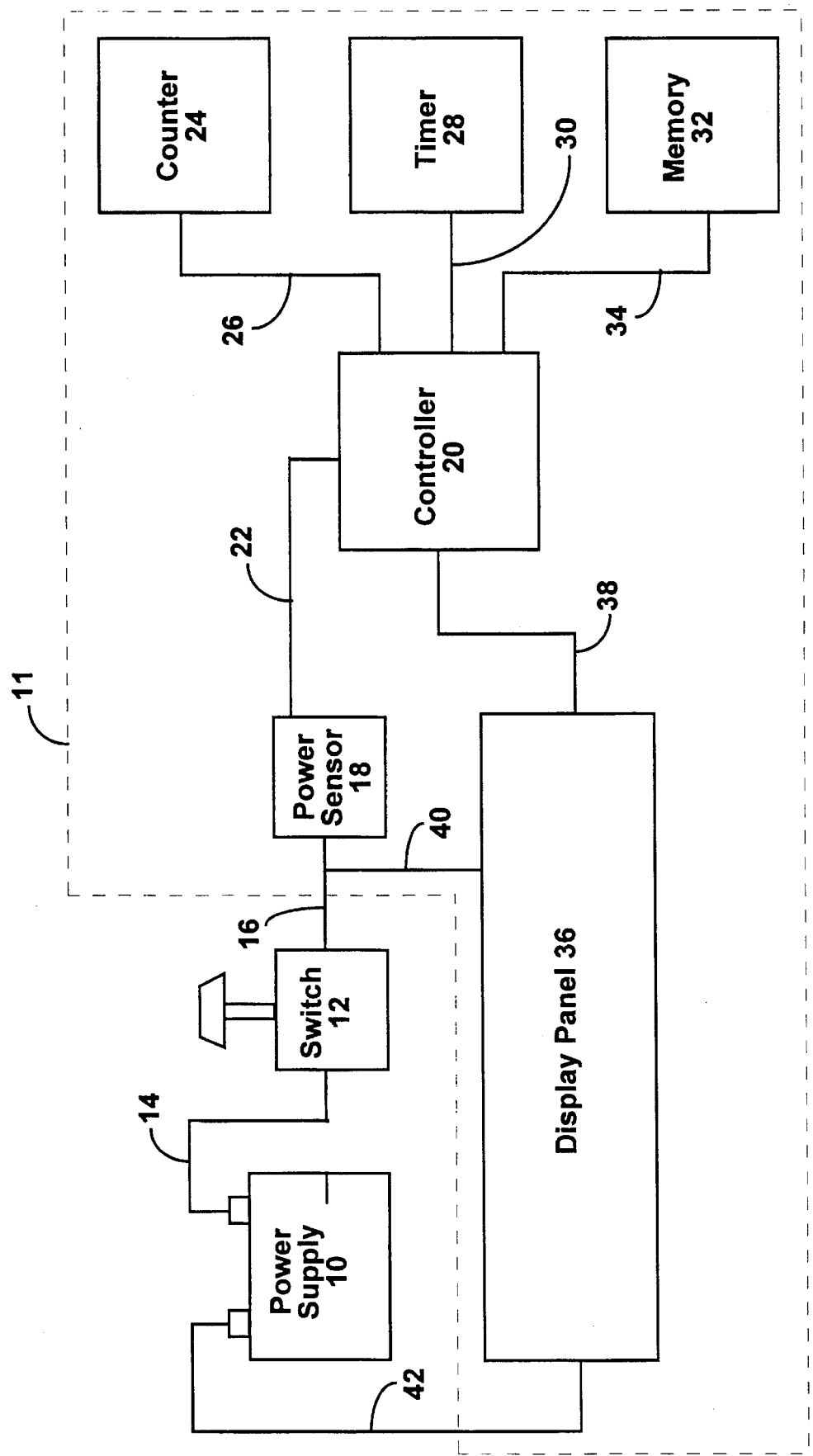
FIG. 4 is a functional schematic of a second embodiment of a display unit according to the present invention.

In an alternate embodiment depicted in FIG. 4, the steering diodes 62 and 64 are replaced as the message storage means by a memory 32, such as an EEPROM or the memory included in them device available from Microchip as part number PIC16C55-HS/P, which may also be used to provide the functions of the controller 20, counter 24, and timer 28. The controller 20 selects one of the messages stored in the memory 32, using the selection process described above, and transfers the selected message to the display panel 36 on line 38. In this embodiment the messages are more easily modified, as they need only be reprogrammed into the memory 32, whereas to change a message stored in steering diodes 62 or 64 requires the diodes to be re-associated with display elements 44 by modifying the hard-wiring between them. However, the steering diode embodiment may be less expensive to implement in a display unit 11 that doesn't require modifiable messages.

Figure 5:
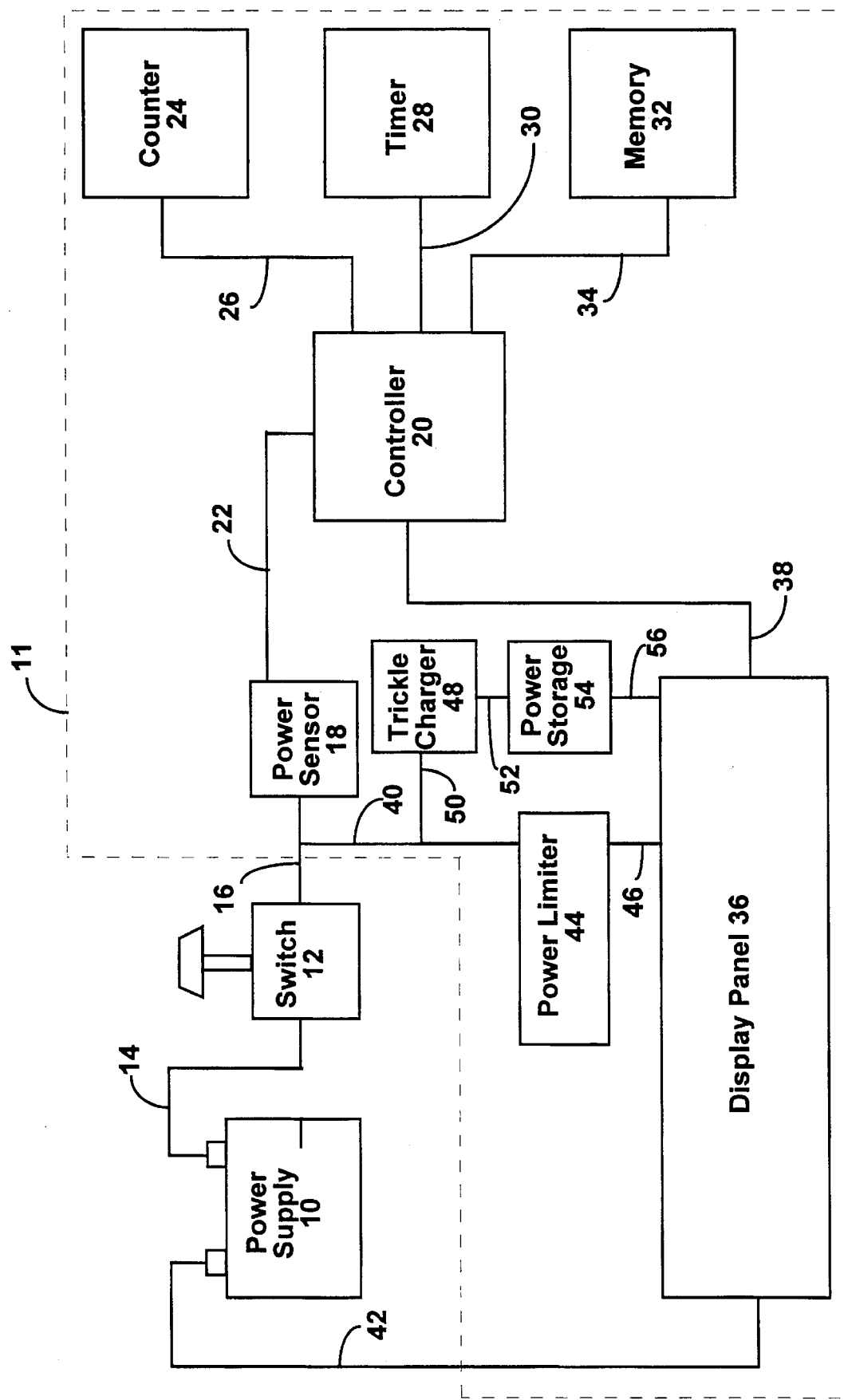
FIG. 5 is a functional schematic of a third embodiment of a display unit according to the present invention.

In a most preferred embodiment depicted in FIG. 5, all the power for the components of display unit 11 is received on line 40, which splits off from line 16, and supplies power to both a power limiter 44, and a trickle charger 48 via line 50. The power limiter 44 passes the power on to the display panel 36 via line 46, and prevents the display panel 36 from drawing too much power from the power supply 10, which prevents problems such as overloading the power supply 10. The power limiter 44 is preferably rated at five amperes.

The trickle charger 48 recharges power storage device 54 via line 52. The power storage device 54 may be a battery or a capacitor, such as a 1.0 farad capacitor, and is connected to the display panel 36 by line 56. At all times when there is power available on line 16, the trickle charger 48 uses some of the available power to recharge the power storage device 54. If there is insufficient power available on lines 16, 40, and 46 when a message is to be presented, then the display panel 36 draws the power required to present the message from the power storage device 54 on line 56.

In addition, the power storage device 54 can keep the message presented for a period of time when there is no power available on line 16. Power storage device 54 is also connected to controller 20, counter 24, timer 28, and memory 32, via lines that are not depicted for the sake of clarity in the drawing. Thus these components also remain operable for a period of time when there is no power available on line 16. In alternate embodiments where the power limiter 44, trickle charger 48, and power storage device 54 are not provided, the components of the display unit 11 receive power directly from line 40.

Figure 6:
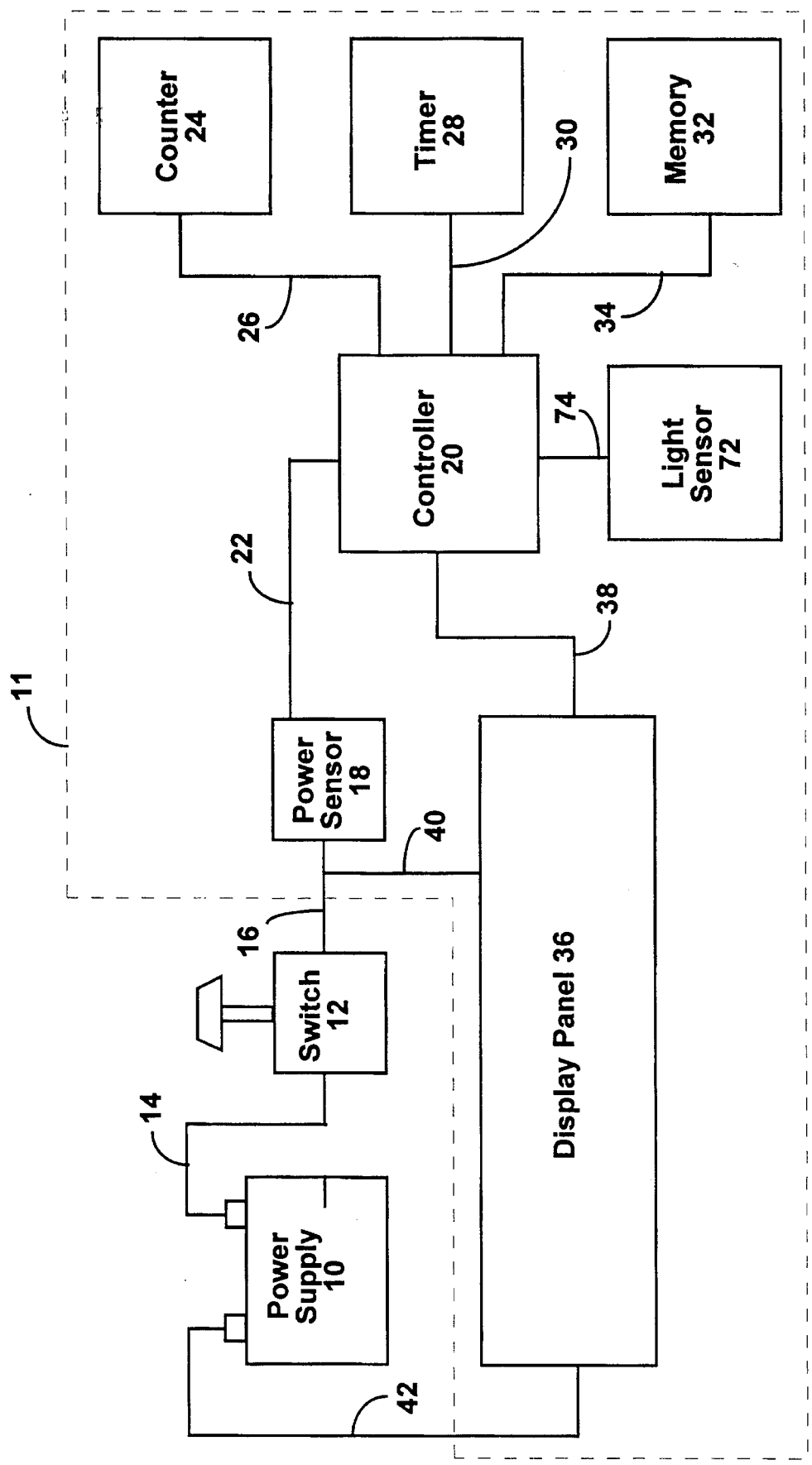
FIG. 6 is a functional schematic of a fourth embodiment of a display unit according to the present invention.

In a further embodiment depicted in FIG. 6, the controller 20 is connected to a light sensor 72 via line 74. The light sensor 72, such as that available from EG&G Vactec as part number VT801, senses the amount of ambient light available at the time that a message is to be presented, so that the controller 20 can optimize the presentation of the message on the display panel 36. If there is a relatively greater amount of ambient light, the controller 20 causes the selected display elements 46 of the display panel 36 to appear relatively brighter than a nominal value, thus enhancing the visibility of the selected display elements 46.

If there is a relatively lesser amount of ambient light, the controller 20 causes the selected display elements 46 of the display panel 36 to appear relatively dimmer than a nominal value, which still provides sufficient contrast in the low ambient light for the presentation of the message to be noticeable, and yet also reduces the power requirement on the power supply 10 or the power storage device 54. The light sensor 72 may also be used in any of the other embodiments depicted in FIGS. 1, 4, or 5.

In a most preferred embodiment, all of the components of the display unit 11 are provided within a single sealed casing, from which line 16 alone leads out. This sealed casing is attached to the exterior frame of the truck, such as at the rear of the truck where it is easily seen by other motorists. By constructing the sealed casing of a durable, conductive material, such as stainless steel, the components are protected from the elements, and the ground line 42 is provided by the sealed casing contacting the grounded frame of the truck.

While preferred embodiments of the present invention are described above, it will be appreciated by those of ordinary skill in the art that the invention is capable of numerous modifications, rearrangements and substitutions of parts without departing from the spirit of the invention.

What is claimed is:

1. A message display unit for presenting messages from a motor vehicle comprising:

a power supply for providing power, an interrupter for producing, within a first predetermined time frame, interruptions in the power provided by the power supply, a power sensor for sensing the interruptions in the power, a counter for counting the interruptions sensed in the power, a timer for measuring the first predetermined time frame during which the interruptions in the power occur, a message storage means for storing at least one message, a controller for selecting one of the stored messages based on the number of interruptions sensed in the power and the first predetermined time frame during which the interruptions in the power occurred, and a display panel for presenting the selected one of the messages.

2. The apparatus of claim 1 wherein the first predetermined time frame comprises from one to ten seconds.

3. The apparatus of claim 2 wherein the first predetermined time frame comprises two seconds.

4. The apparatus of claim 1 further comprising the controller for ceasing the presentation of the selected one of the messages after a second predetermined time frame.

5. The apparatus of claim 4 wherein the second predetermined time frame comprises three seconds.

6. The apparatus of claim 4 wherein the second predetermined time frame is a variable time frame that is dependant on, and associated with, the message selected by the controller.

7. The apparatus of claim 1 wherein the display panel further comprises a plurality of display elements such that the selected one of the messages is presented by the selection of different patterns of the display elements.

8. The apparatus of claim 7 wherein the display elements further comprise light emitting diodes.

9. The apparatus of claim 7 wherein the display elements further comprise incandescent lamps.

10. The apparatus of claim 7 wherein the display elements further comprise fluorescent dots.

11. The apparatus of claim 1 further comprising:

a power limiter for limiting the amount of power drawn from the power supply, a power storage device for receiving power from the power supply, and for providing power when the power from the power supply is interrupted, and a charger for regulating the power received from the power supply by the power storage device.

12. The apparatus of claim 11 wherein the power storage device further comprises a rechargeable battery.

13. The apparatus of claim 11 wherein the power storage device further comprises a capacitor.

14. The apparatus of claim 1 wherein the display panel further comprises at least one marker light for illuminating at all times that the power supply is supplying power.

15. The apparatus of claim 1 further comprising a light sensor for detecting ambient light, and for optimizing the presentation of the selected one of the messages on the display panel based on the ambient light.

16. The apparatus of claim 1 wherein the selected one of the messages is presented intermittently for the duration of a second predetermined time frame.

17. The apparatus of claim 1 wherein the message storage means further comprises a programmable digital memory storage device.

18. The apparatus of claim 1 wherein the selected one of the messages is presented continually until the power sensor senses subsequent interruptions in the power.

19. A message display unit for presenting messages from a motor vehicle comprising:

a display panel having display elements, a power supply for providing power, an interrupter for producing, within a first predetermined time frame, interruptions in the power provided by the power supply, a power sensor for sensing the interruptions in the power, a counter for counting the interruptions sensed in the power, a timer for measuring the first predetermined time frame during which the interruptions in the power occur, a controller for energizing a selected one of a plurality of outputs based on the number of interruptions sensed in the power and the first predetermined time frame during which the interruptions in the power occurred, and a plurality of switch sets, each switch set having a plurality of switches, the number of switch sets equal to the number of outputs, and each switch set associated with a different one of each of the outputs, each switch in a switch set associated with a different one of the display elements, each switch set being responsive to the output with which it is associated, such that when the associated output is energized, each switch in the switch set energizes the display element with which the switch is associated, the energized display elements forming a message thereby.

20. A method for presenting a message from a motor vehicle comprising:

providing power from a power supply, interrupting, within a first predetermined time frame, the power provided by the power supply, sensing the interruptions in the power, counting the interruptions sensed in the power, measuring the first predetermined time frame during which the interruptions occur in the power, storing at least one message in a memory, selecting one of the messages based on the number of interruptions sensed in the power and the first predetermined time frame during which the interruptions in the power occurred, and presenting the selected one of the messages on a display panel.

21. A message display unit for receiving power and presenting messages from a motor vehicle, comprising:

a line for receiving power from the motor vehicle, a power sensor for sensing interruptions in the power received by the line, a timer for measuring a first predetermined time frame, a counter for counting the interruptions in the power sensed by the power sensor during the first predetermined time frame, a message storage means for storing at least one message, a controller for selecting one of the stored messages based on the number of interruptions sensed in the power during the first predetermined time frame, and a display panel for presenting the selected one of the messages.

* * * * *